(12) United States Patent
Sun et al.

(10) Patent No.: US 11,271,489 B2
(45) Date of Patent: Mar. 8, 2022

(54) AC-DC POWER SUPPLY AND MOTOR

(71) Applicant: Nidec Corporation, Kyoto (JP)

(72) Inventors: XiaoXia Sun, Kyoto (JP); Haruki Kitakawa, Kyoto (JP); Takashi Togawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 390 days.

(21) Appl. No.: 16/344,370

(22) PCT Filed: Nov. 9, 2017

(86) PCT No.: PCT/JP2017/040347
§ 371 (c)(1),
(2) Date: Apr. 24, 2019

(87) PCT Pub. No.: WO2018/088454
PCT Pub. Date: May 17, 2018

(65) Prior Publication Data
US 2021/0288587 A1  Sep. 16, 2021

(30) Foreign Application Priority Data

Nov. 14, 2016  (JP) .............................. JP2016-221689

(51) Int. Cl.
*H05B 45/382* (2020.01)
*H02M 7/00* (2006.01)
(Continued)

(52) U.S. Cl.
CPC ............. *H02M 7/003* (2013.01); *H02M 1/08* (2013.01); *H02M 1/4208* (2013.01); *H02M 7/06* (2013.01); *H02P 7/292* (2013.01)

(58) Field of Classification Search
CPC ...... H02M 7/003; H02M 1/08; H02M 1/4208; H02M 7/06; H02M 3/04; H02P 7/292; H05B 45/382
See application file for complete search history.

(56) References Cited

U.S. PATENT DOCUMENTS

2014/0247030 A1* 9/2014 Sakai ...................... H02M 3/04
  323/283
2015/0091465 A1* 4/2015 Kato .................... H05B 45/382
  315/205

FOREIGN PATENT DOCUMENTS

JP    7-288978 A    10/1995
JP    10-75571 A    3/1998
(Continued)

OTHER PUBLICATIONS

Official Communication issued in corresponding European Patent Application No. 17870103.3, dated May 27, 2020.
(Continued)

*Primary Examiner* — Cortez M Cook
(74) *Attorney, Agent, or Firm* — Keating & Bennett

(57) ABSTRACT

An alternating-current (AC)—direct-current (DC) power supply includes a circuit board including an alternating-current input terminal to which an alternating current is input and a direct-current output terminal from which a direct current is output. The AC-DC power supply includes a diode bridge that rectifies the alternating current input via the alternating-current input terminal, an alternating-current input line that electrically connects the alternating-current input terminal and the diode bridge, a coil connected to the diode bridge, a diode connected to the direct-current output terminal, a switching line that electrically connects the coil and the diode, and a switching element connected to the switching line. A portion of the switching line is disposed at right angles to a portion of the alternating-current input line.

10 Claims, 3 Drawing Sheets

(51) Int. Cl.
*H02M 1/08* (2006.01)
*H02M 1/42* (2007.01)
*H02M 7/06* (2006.01)
*H02P 7/292* (2016.01)

(56) References Cited

FOREIGN PATENT DOCUMENTS

| | | |
|---|---|---|
| JP | 2011-62005 A | 3/2011 |
| JP | 2015-233375 A | 12/2015 |
| JP | 2016-123272 A | 7/2016 |

OTHER PUBLICATIONS

Yuan, "Design of Power Factor Correction Circuit Using AP1661A", BCD Semiconductor Manufacturing Limited, Application Note 1040, XP055695411, Sep. 1, 2009, pp. 1-7.

Ken et al., "Practical design and evaluation of an 800 W PFC boost converter using TO-247 4pin MOSFET,600 V CoolMOS C7", AN_201409_PL52_012, XP055695716, Nov. 26, 2015.

Infineon, "IRAC1152-350W Reference Design Kit for IR1152 (Fixed 66kHz Frequency, One Cycle Control PFC IC with Brown-Out Protection)", Data Sheet No. PD97152, XP055695649, Feb. 18, 2011, pp. 1-24.

Rossetto et al., "Conducted EMI Issues in a Boost PFC Design", Telecommunications Energy Conference, XP010350648, Oct. 4, 1998, pp. 188-195.

Official Communication issued in International Patent Application No. PCT/JP2017/040347, dated Dec. 26, 2017.

* cited by examiner

AC-DC POWER SUPPLY AND MOTOR

CROSS REFERENCE TO RELATED APPLICATIONS

This is the U.S. national stage of application No. PCT/JP2017/040347, filed on Nov. 9, 2017, and priority under 35 U.S.C. § 119(a) and 35 U.S.C. § 365(b) is claimed from Japanese Application No. 2016-221689, filed Nov. 14, 2016; the entire contents of which are incorporated herein by reference.

FIELD OF THE INVENTION

The present disclosure relates to an alternating current (AC)—direct current (DC) power supply and a motor.

BACKGROUND

There are known power conversion systems in the related art in which an alternating current is converted to a direct current.

In a known power conversion system, a plurality of components, such as a rectifier stack and a power-factor improvement module, disposed between an alternating current input portion and a direct current output portion are connected to each other through lines. This results in an increase in the size of the entire system. In order to make the entire system compact, the plurality of components between the alternating current input portion and the direct current output portion may be mounted on a single circuit board. In this case, a switching noise generated from the line among the reactor (coil), the reverse blocking diode, and the switching element can exert an influence on the alternating current input portion, due to electromagnetic induction.

SUMMARY

Example embodiments of the present disclosure provide AC-DC power supplies and motors, each of which is reduced in size and in which an influence of switching noise on an alternating-current input line is reduced.

According to an example embodiment of the present disclosure, an alternating-current (AC)—direct-current (DC) power supply including a circuit board is provided. The circuit board includes an alternating-current input terminal to which an alternating current is input and a direct-current output terminal from which a direct current is output. The AC-DC power supply includes a diode bridge that rectifies the alternating current input via the alternating-current input terminal, an alternating-current input line that electrically connects the alternating-current input terminal and the diode bridge, a coil connected to the diode bridge, a diode connected to the direct-current output terminal, a switching line that electrically connects the coil and the diode, and a switching element connected to the switching line. A portion of the switching line is disposed at right angles to a portion of the alternating-current input line.

In another example embodiment of the present disclosure, a motor including the AC-DC power supply is provided.

The above and other elements, features, steps, characteristics and advantages of the present disclosure will become more apparent from the following detailed description of the example embodiments with reference to the attached drawings.

DETAILED DESCRIPTION

First Example Embodiment

Figure 1:
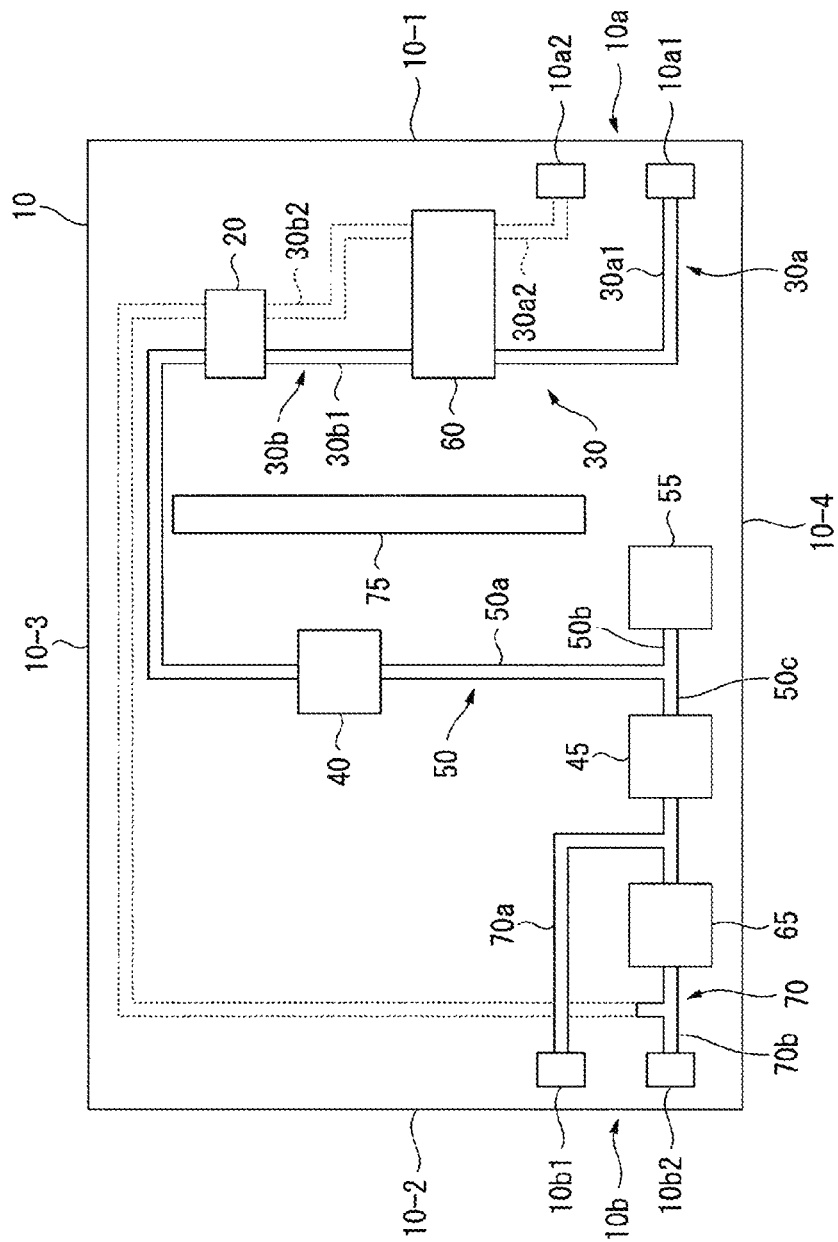
FIG. 1 is a plan view of an AC-DC power supply of a first example embodiment of the present disclosure.

As illustrated in FIG. 1, an AC-DC power supply according to a first example embodiment includes a circuit board 10. The circuit board 10 includes an alternating-current input terminal 10a to which an alternating current is input. The alternating-current input terminal 10a includes a live or line (L)-side alternating-current input terminal 10a1 and a neutral (N)-side alternating-current input terminal 10a2. The circuit board 10 includes a direct-current output terminal 10b from which a direct current is output. The direct-current output terminal 10b includes a high-potential-side direct-current output terminal 10b1 and a low-potential-side direct-current output terminal 10b2. In other words, in the AC-DC power supply of the first example embodiment, the alternating-current input terminal 10a and the direct-current output terminal 10b are disposed on the single circuit board 10. For this reason, the entire AC-DC power supply can be smaller than that in the case in which the alternating-current input terminal and the direct-current output terminal are not disposed on a single circuit board.

The AC-DC power supply of the first example embodiment includes a diode bridge 20, an alternating-current input line 30, a coil 40, a diode 45, a switching line 50, and a switching element 55. The diode bridge 20 rectifies alternating currents input through the L-side alternating-current input terminal 10a1 and the N-side alternating-current input terminal 10a2 of the alternating-current input terminal 10a. The alternating-current input line 30 electrically connects the alternating-current input terminal 10a and the diode bridge 20. The alternating-current input line 30 includes an alternating-current-input-terminal adjacent portion 30a adjacent to the alternating-current input terminal 10a and a diode-bridge adjacent portion 30b adjacent to the diode bridge 20. The alternating-current-input-terminal adjacent portion 30a includes an L-side alternating-current-input-terminal adjacent portion 30a1 and an N-side alternating-current-input-terminal adjacent portion 30a2. The diode-bridge adjacent portion 30b includes an L-side diode-bridge adjacent portion 30b1 and an N-side diode-bridge adjacent portion 30b2.

The alternating-current input line 30 may be constituted by a land (pattern) formed on the circuit board 10 or may be constituted by an electronic component mounted on the circuit board 10. Alternatively, the alternating-current input line 30 may be constituted by a land formed on the circuit board 10 and an electronic component mounted on the circuit board 10.

The coil 40 is connected to the diode bridge 20. The diode 45 is electrically connected to the direct-current output terminal 10b through a direct-current output line 70. The direct-current output line 70 includes a high-potential-side direct-current output line 70a and a low-potential-side direct-current output line 70b. A capacitor 65 is disposed on the low-potential-side direct-current output line 70b. The direct-current output line 70 may be constituted by a land (pattern) provided on the circuit board 10 or may be constituted by an electronic component mounted on the circuit board 10. Alternatively, the direct-current output line 70 may be constituted by a land provided on the circuit board 10 and an electronic component mounted on the circuit board 10.

The diode 45 is connected to the high-potential-side direct-current output terminal 10b1 through the high-potential-side direct-current output line 70a and is connected to the low-potential-side direct-current output terminal 10b2 through the low-potential-side direct-current output line 70b. The switching line 50 electrically connects the coil 40 and the diode 45. The switching element 55 is connected to the switching line 50. In other words, the switching line 50 is disposed between the coil 40, the diode 45, and the switching element 55. The switching line 50 includes a coil adjacent portion 50a adjacent to the coil 40, a switching element adjacent portion 50b adjacent to the switching element 55, and a diode adjacent portion 50c adjacent to the diode 45. The switching line 50 may be constituted by a land provided on the circuit board 10 or may be constituted by an electronic component mounted on the circuit board 10. Alternatively, the switching line 50 may be constituted by a land provided on the circuit board 10 and an electronic component mounted on the circuit board 10.

For example, a magnetic field is generated around a portion through which a current flows, such as the switching line 50. The current flowing through the switching line 50 fluctuates due to, for example, a switching noise generated in the switching line 50. This causes the magnetic field generated around the switching line 50 to fluctuate. If the entire AC-DC power supply is small in size, the magnetic field generated around the switching line 50 may be applied to the alternating-current input line 30. In the case in which the magnetic field generated around the switching line 50 is applied to the alternating-current input line 30, fluctuations in the electric current flowing through the switching line 50 may cause the electric current flowing through the alternating-current input line 30 to fluctuate due to electromagnetic induction.

Specifically, in the case in which the switching line 50 and the alternating-current input line 30 are parallel to each other, fluctuations in the electric current flowing through the switching line 50 causes the electric current flowing through the alternating-current input line 30 to fluctuate. In contrast, in the case in which the switching line 50 and the alternating-current input line 30 are perpendicular to each other, even if the electric current flowing through the switching line 50 fluctuates, the electric current flowing through the alternating-current input line 30 does not fluctuate due to electromagnetic induction.

Accordingly, in the AC-DC power supply of the first example embodiment, part of the switching line 50 is disposed at right angles to part of the alternating-current input line 30. This allows reducing the influence of the switching noise on the alternating-current input line 30 as compared with a case in which the entire switching line is disposed parallel to the entire alternating-current input line.

Specifically, in the AC-DC power supply of the first example embodiment, the coil adjacent portion 50a is disposed at right angles to the alternating-current-input-terminal adjacent portion 30a. In the example illustrated in FIG. 1, the coil adjacent portion 50a is disposed at right angles to part of the L-side alternating-current-input-terminal adjacent portion 30a1. This allows reducing the influence of the switching noise on the alternating-current-input-terminal adjacent portion 30a of the alternating-current input line 30 as compared with a case in which the coil adjacent portion is disposed parallel to the entire alternating-current-input-terminal adjacent portion. In other words, the AC-DC power supply of the first example embodiment can be made compact as a whole and allows reducing the influence of the switching noise on the alternating-current-input-terminal adjacent portion 30a of the alternating-current input line 30.

The diode bridge 20 is disposed between the alternating-current-input-terminal adjacent portion 30a and the switching element 55. In other words, the switching element 55 is away from the alternating-current-input-terminal adjacent portion 30a. This allows reducing the influence of the switching noise on the alternating-current-input-terminal adjacent portion 30a as compared with a case in which the switching element is close to the alternating-current-input-terminal adjacent portion.

The AC-DC power supply of the first example embodiment further includes an electromagnetic-compatibility (EMC) countermeasure member 60. The EMC countermeasure member 60 is disposed in the alternating-current input line 30. Examples of the EMC countermeasure member 60 include an X capacitor, a Y capacitor, a choke coil, and a line filter. The alternating-current-input-terminal adjacent portion 30a connects the alternating-current input terminal 10a and the EMC countermeasure member 60. The diode-bridge adjacent portion 30b connects the direct-current output terminal 10b and the EMC countermeasure member 60.

In other words, in the AC-DC power supply of the first example embodiment, the EMC countermeasure member 60 is disposed between the switching line 50 and the alternating-current-input-terminal adjacent portion 30a. This allows reducing the influence of the switching noise on the alternating-current-input-terminal adjacent portion 30a as compared with a case in which no EMC countermeasure member is disposed between the switching line and the alternating-current-input-terminal adjacent portion.

In the example illustrated in FIG. 1, the switching element 55 is a gallium nitride field-effect transistor. In another example, the switching element 55 may be any another switching element. The gallium nitride field-effect transistor is more suitable for high-speed switching than other switching elements and is expected to reduce a loss in power devices. Meanwhile, reduction of switching noise caused by an increased switching frequency is required.

Figure 2:
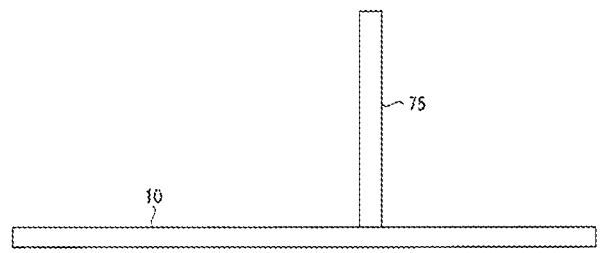
FIG. 2 is a front view of the AC-DC power supply of the first example embodiment of the present disclosure.

The AC-DC power supply of the first example embodiment further includes a gate driver that drives the switching element 55 and a DC-DC converter 75 that supplies power to the gate driver. As illustrated in FIG. 2, the DC-DC converter 75 is disposed at right angles to the circuit board 10. This allows suppressing propagation of a noise generated in the DC-DC converter 75 to the circuit board 10 as compared with a case in which the DC-DC converter is disposed parallel to the circuit board. This also allows suppressing propagation of a noise generated in the circuit board 10 to the DC-DC converter 75 as compared with a case in which the DC-DC converter is disposed parallel to the circuit board.

In the example illustrated in FIG. 1, the circuit board 10 is rectangular in shape. The circuit board 10 includes a first side 10-1, a second side 10-2, a third side 10-3, and a fourth side 10-4. The second side 10-2 is opposite the first side 10-1. The third side 10-3 is disposed at right angles to the first side 10-1. The fourth side 10-4 is opposite the third side 10-3. The alternating-current input terminal 10a is disposed on the first side 10-1. The direct-current output terminal 10b is disposed on the second side 10-2. This allows the alternating-current input terminal 10a and the direct-current output terminal 10b to be disposed away from each other as compared with a case in which the alternating-current input terminal and the direct-current output terminal are disposed on the same side. This allows reducing an influence of the noise generated in the vicinity of the direct-current output terminal 10b on the alternating-current-input-terminal adjacent portion 30a.

Second Example Embodiment

Figure 3:
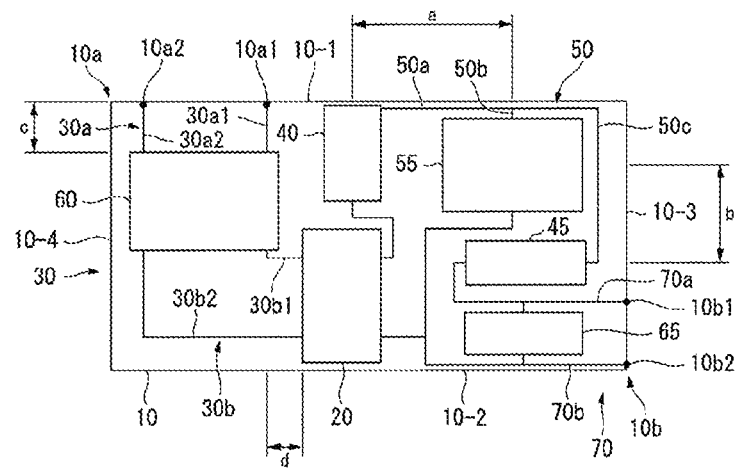
FIG. 3 is a plan view of an AC-DC power supply of a second example embodiment of the present disclosure.

In an AC-DC power supply of a second example embodiment illustrated in FIG. 3, the positions of the alternating-current input terminal 10a and the direct-current output terminal 10b of the circuit board 10 differs from those of the AC-DC power supply of the first example embodiment illustrated in FIG. 1.

In the AC-DC power supply of the second example embodiment illustrated in FIG. 3, the positions of the diode bridge 20, the coil 40, the diode 45, the switching element 55, the capacitor 65, and the EMC countermeasure member 60 mounted on the circuit board 10 differ from those of the AC-DC power supply of the first example embodiment illustrated in FIG. 1. Furthermore, in the AC-DC power supply of the second example embodiment illustrated in FIG. 3, the positions of the alternating-current input line 30, the switching line 50, and the direct-current output line 70 mounted on the circuit board 10 differ from those of the AC-DC power supply of the first example embodiment illustrated in FIG. 1.

Also in the AC-DC power supply of the second example embodiment, part of the switching line 50 is disposed at right angles to part of the alternating-current input line 30, as illustrated in FIG. 3. This allows reducing the influence of the switching noise on the alternating-current input line 30 as compared with a case in which the entire switching line is disposed parallel to the entire alternating-current input line.

Specifically, in the AC-DC power supply of the second example embodiment, the coil adjacent portion 50a is disposed at right angles to the alternating-current-input-terminal adjacent portion 30a. In the example illustrated in FIG. 3, the coil adjacent portion 50a is disposed at right angles to the L-side alternating-current-input-terminal adjacent portion 30a1 and the N-side alternating-current-input-terminal adjacent portion 30a2. This allows reducing the influence of the switching noise on the alternating-current-input-terminal adjacent portion 30a of the alternating-current input line 30 as compared with a case in which the coil adjacent portion is disposed parallel to the alternating-current-input-terminal adjacent portion. In other words, the AC-DC power supply of the second example embodiment can be made compact as a whole and allows reducing the influence of the switching noise on the alternating-current-input-terminal adjacent portion 30a of the alternating-current input line 30.

As illustrated in FIG. 3, the diode bridge 20 is disposed between the alternating-current-input-terminal adjacent portion 30a and the switching element 55. In other words, the switching element 55 is disposed away from the alternating-current-input-terminal adjacent portion 30a in the lateral direction in FIG. 3. This allows reducing the influence of the switching noise on the alternating-current-input-terminal adjacent portion 30a as compared with a case in which the switching element is close to the alternating-current-input-terminal adjacent portion.

As illustrated in FIG. 3, also in the AC-DC power supply of the second example embodiment, the EMC countermeasure member 60 is disposed between the switching line 50 and the alternating-current-input-terminal adjacent portion 30a. This allows reducing the influence of the switching noise on the alternating-current-input-terminal adjacent portion 30a as compared with a case in which no EMC countermeasure member is disposed between the switching line and the alternating-current-input-terminal adjacent portion.

In the AC-DC power supply of the second example embodiment illustrated in FIG. 3, the circuit board 10 is rectangular in shape as that of the AC-DC power supply of the first example embodiment illustrated in FIG. 1. In the AC-DC power supply of the second example embodiment, the direct-current output line 70 is disposed at right angles to the alternating-current-input-terminal adjacent portion 30a. This allows reducing the influence of the noise generated in the direct-current output line 70 on the alternating-current-input-terminal adjacent portion 30a as compared with a case in which the direct-current output line is disposed parallel to the alternating-current-input-terminal adjacent portion.

In the AC-DC power supply of the second example embodiment, the coil 40 is disposed between the alternating-current-input-terminal adjacent portion 30a and the switching element 55 as illustrated in FIG. 3. A first direction (the lateral direction in FIG. 3) in which the coil adjacent portion 50a extends is perpendicular to a second direction (the vertical direction in FIG. 3) in which the alternating-current-input-terminal adjacent portion 30a extends. A distance a between the coil 40 and the switching element 55 in the first direction is larger than a distance b between the switching element 55 and the diode 45 in the second direction. In other words, the switching element 55 is away from the alternating-current-input-terminal adjacent portion 30a. This allows reducing the influence of the switching noise on the alternating-current-input-terminal adjacent portion 30a as compared with a case in which the switching element is close to the alternating-current-input-terminal adjacent portion.

In the AC-DC power supply of the second example embodiment, part of the diode-bridge adjacent portion 30b is parallel to the coil adjacent portion 50a, as illustrated in FIG. 3. In other words, the L-side diode-bridge adjacent portion 30b1 and the N-side diode-bridge adjacent portion 30b2 each have a portion parallel to the coil adjacent portion 50a and a portion perpendicular to the coil adjacent portion 50a. The length d of the portion of the L-side diode-bridge adjacent portion 30b1 parallel to the coil adjacent portion 50a is smaller than the length c of the alternating-current-input-terminal adjacent portion 30a.

In other words, in the AC-DC power supply of the second example embodiment, the influence of the switching noise on the L-side diode-bridge adjacent portion 30b1 can be reduced as compared with a case in which the length d of the portion of the L-side diode-bridge adjacent portion 30b1 parallel to the coil adjacent portion 50a is larger than the length c of the alternating-current-input-terminal adjacent portion 30a perpendicular to the coil adjacent portion 50a.

Third Example Embodiment

Figure 4:
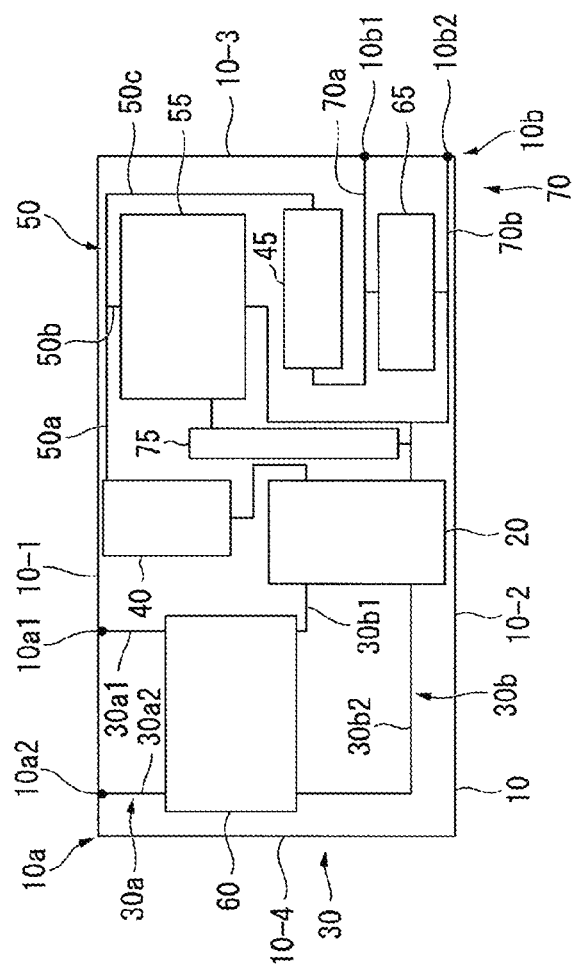
FIG. 4 is a plan view of an AC-DC power supply of a third example embodiment of the present disclosure.

While the AC-DC power supply of the second example embodiment illustrated in FIG. 3 includes no DC-DC converter, an AC-DC power supply of a third example embodiment illustrated in FIG. 4 includes a DC-DC converter 75. Specifically, the AC-DC power supply of the third example embodiment includes a gate driver that drives the switching element 55 and the DC-DC converter 75 that supplies power to the gate driver. The DC-DC converter 75 is disposed at right angles to the circuit board 10. This allows suppressing propagation of a noise generated in the DC-DC converter 75 to the circuit board 10 as compared with a case in which the DC-DC converter is disposed parallel to the circuit board. This also suppressing propagation of a noise generated in the circuit board 10 to the DC-DC converter 75 as compared with a case in which the DC-DC converter is disposed parallel to the circuit board. The AC-DC power supplies of the first to third example embodiments are applicable to motors. Since a motor including the AC-DC power supply according to the first, second, or third example embodiment is reduced in electromagnetic noise, the motor has little influence on other electronic devices. For this reason, the motor of the present disclosure can be used in all systems.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An alternating-current (AC)—direct-current (DC) power supply comprising:
   a circuit board including:
      an alternating-current input terminal to which an alternating current is input; and
      a direct-current output terminal from which a direct current is output;
   a diode bridge that rectifies the alternating current input via the alternating-current input terminal;
   an alternating-current input line that electrically connects the alternating-current input terminal and the diode bridge;
   a coil connected to the diode bridge;
   a diode connected to the direct-current output terminal;
   a switching line that electrically connects the coil and the diode; and
   a switching element connected to the switching line; wherein
   a portion of the switching line is disposed at right angles to a portion of the alternating-current input line;
   the switching line includes a coil adjacent portion adjacent to the coil;
   the alternating-current input line includes an alternating-current-input-terminal adjacent portion adjacent to the alternating-current input terminal;
   the coil adjacent portion is disposed at right angles to the alternating-current-input-terminal adjacent portion;
   the alternating-current input line includes a diode-bridge adjacent portion adjacent to the diode bridge;
   the diode-bridge adjacent portion is parallel to the coil adjacent portion; and
   the diode-bridge adjacent portion is shorter than the alternating-current-input-terminal adjacent portion.

2. The AC-DC power supply according to claim 1, wherein the diode bridge is disposed between the alternating-current-input-terminal adjacent portion and the switching element.

3. The AC-DC power supply according to claim 1, further comprising:
   an electromagnetic-compatibility (EMC) countermeasure member; wherein
   the EMC countermeasure member is disposed in the alternating-current input line; and
   the alternating-current-input-terminal adjacent portion connects the alternating-current input terminal and the EMC countermeasure member.

4. The AC-DC power supply according to claim 1, wherein the coil is disposed between the alternating-current-input-terminal adjacent portion and the switching element.

5. The AC-DC power supply according to claim 4, wherein
   a first direction in which the coil adjacent portion extends is perpendicular to a second direction in which the alternating-current-input-terminal adjacent portion extends; and
   a distance between the coil and the switching element in the first direction is larger than a distance between the switching element and the diode in the second direction.

6. The AC-DC power supply according to claim 1, further comprising:
   a direct-current output line that electrically connects the direct-current output terminal and the diode; wherein
   the direct-current output line is disposed at right angles to the alternating-current-input-terminal adjacent portion.

7. The AC-DC power supply according to claim 1, wherein
   the circuit board is rectangular;
   the alternating-current input terminal is disposed on a first side of the circuit board; and
   the direct-current output terminal is disposed on a second side that is opposite the first side.

8. The AC-DC power supply according to claim 1, wherein the switching element is a gallium nitride field-effect transistor.

9. The AC-DC power supply according to claim 1, further comprising:
   a gate driver that drives the switching element; and
   a DC-DC converter that supplies power to the gate driver; wherein
   the DC-DC converter is disposed at right angles to the circuit board.

10. A motor comprising the AC-DC power supply according to claim 1.

* * * * *